Figure 3:
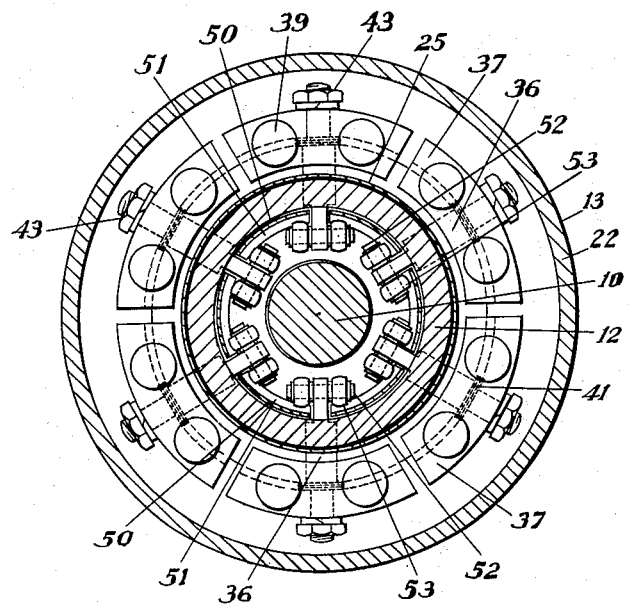

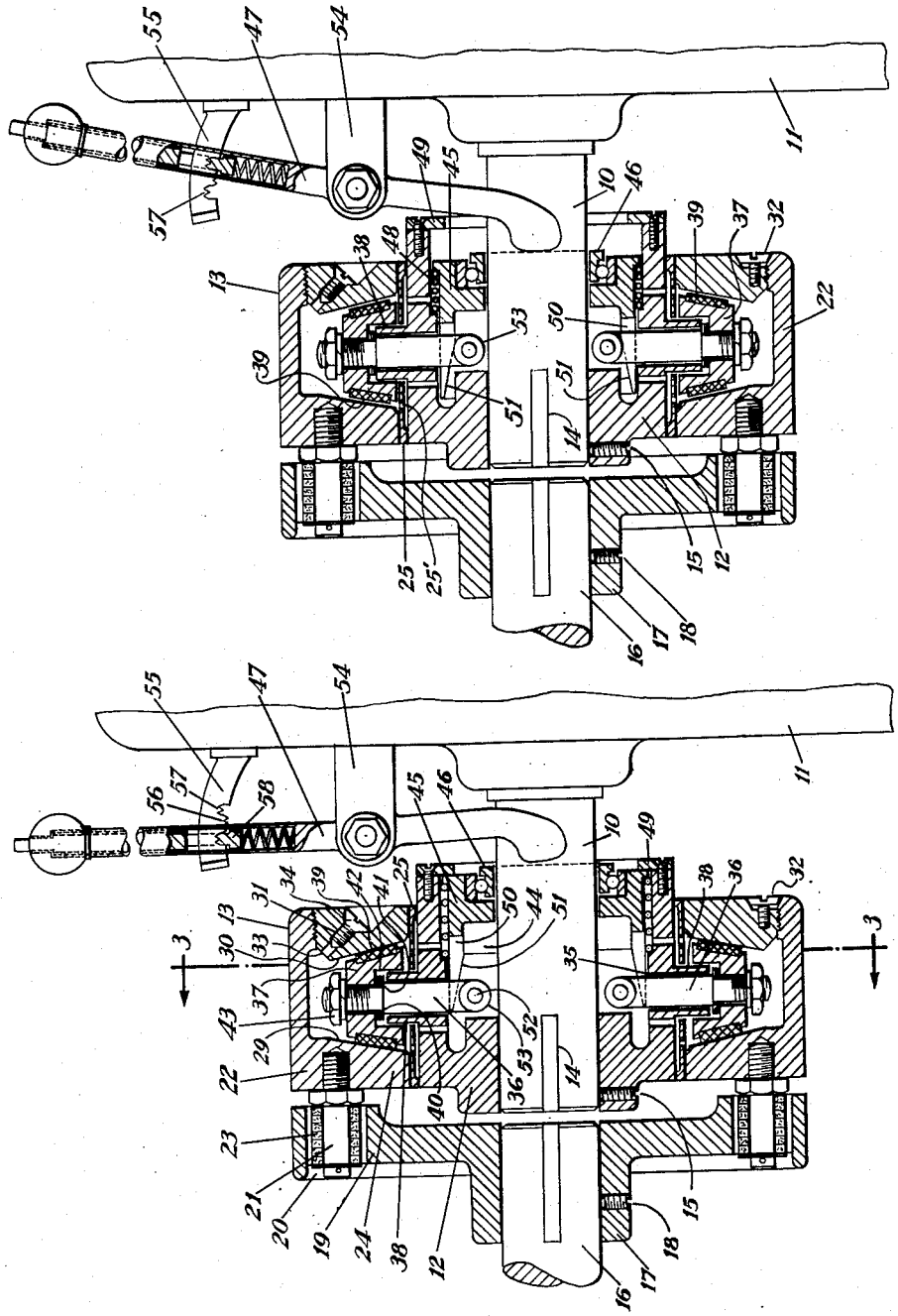

July 15, 1947. A. H. JENSON 2,423,979
RELEASABLE COUPLING
Filed Dec. 11, 1944 2 Sheets-Sheet 2

ARTHUR H. JENSON · INVENTOR.

BY
Cromwell, Druist + Warden
Attys.

Patented July 15, 1947

2,423,979

UNITED STATES PATENT OFFICE 2,423,979

RELEASABLE COUPLING

Arthur H. Jenson, Evanston, Ill., assignor to Amalgamated Engineering & Research Corporation, Chicago, Ill., a corporation of Illinois Application December 11, 1944, Serial No. 567,725

6 Claims. (Cl. 192—105)

The present invention relates to a lubricated, centrifugal torque-transmitting device and includes certain improvements whereby the device, which may be embodied as a shaft coupling, pulley, clutch, starter, transmission, or the like, may be instantly disconnected from a driving source at will.

An object of the present invention is to provide, in combination with a lubricated torque-transmitting device incorporating centrifugally acting weights which serve as friction means for transmitting torque, instrumentalities for quickly and uniformly disengaging the weights from a member engaged thereby and thus interrupting power transmission through the device.

A further object is to provide a combination of the type described wherein the control instrumentalities are simple in construction but highly effective in operation, and wherein the parts controlled may at all times be quickly manipulated for engaging or disengaging action without lost motion.

A further general object is to provide a transmission device of the type described wherein the transmission of power may be interrupted or resumed as desired without halting or reducing the speed of the power source or prime mover.

A still further object resides in the provision of a releasable clutch control for a centrifugal torque-transmission device of the type described, wherein the latter may be either fully engaged in its centrifugal coupling action; entirely disengaged with the driven member or device completely disconnected from the source of drive; or intermediately engaged with less than full frictional effect to constitute a dry slip connection.

Yet a further object is to provide a clutch controlled, centrifugal weight type torque-transmitting device of the type described which is self-lubricating and wherein the centrifugal clutching and driving action is brought into effect quickly but gradually upon initiation of operation of the driving source, or upon re-coupling of the driven and driving members.

Other and more specific objects of the invention will be pointed out or indicated hereinafter or will be apparent upon an understanding of the invention or upon actual use of it.

For the purpose of aiding in an explanation of the invention I show in the accompanying drawing, forming a part of this specification, one form in which it may be embodied. It will be understood, however, that this disclosure is presented merely for purpose of illustration and is not to be regarded as imposing unnecessary limitations on the appended claims, which are intended to define the invention.

I have illustrated the present improvements as incorporated in a centrifugal weight type, lubricated shaft coupling whereby aligned driving and driven shafts are automatically coupled frictionally to one another upon rotation of the driving shaft at predetermined speed. However, I desire it to be understood that the invention is equally applicable to other similar instrumentalities the operation of which involves similar principles, for example, pulleys, clutches, starters, transmissions, and the like. Per se the torque-transmitting device embodied in the present coupling is of a type the general nature of which is known; however, I have evolved certain improvements and refinements in that structure, together with an improved control or clutch device which is particularly well adapted for association with the centrifugal type coupling. The result is a power transmission of greatly improved character, well adapted for manual control or for automatic control by a suitable sensitive device associated with the driven instrumentality. In the last named adaptation my improvements provide a power transmission which is very quickly engageable and disengageable in response to the demands of such an automatic instrumentality.

Figures 4, 5, 6:
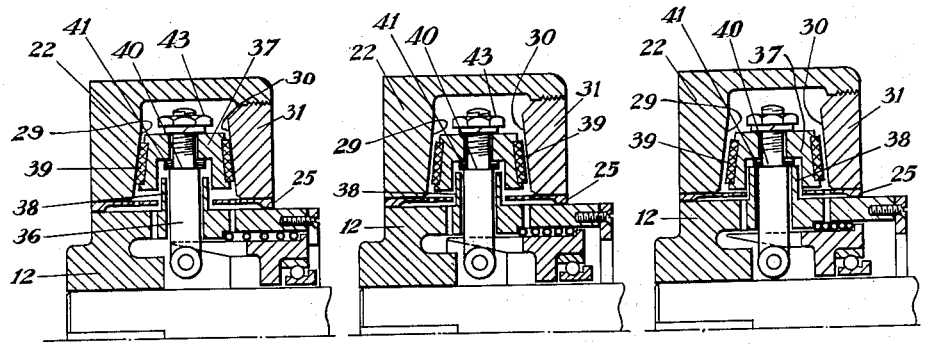

In the drawings,

Figs. 1 and 2 are fragmentary views illustrating the releasable torque-transmission device of the invention, being in vertical longitudinal section through the shaft coupling which embodies the device, and respectively illustrating said coupling in engaged power-transmitting relation of the parts and in de-clutched, disengaged relation thereof;

Fig. 3 is a view of the coupling in transverse vertical sectional section on a line generally corresponding to line 3—3 of Fig. 1; and Figs. 4, 5 and 6 are fragmentary sectional views, in section generally similar to that of Figs. 1 and 2, illustrating with particularity successive positions of the centrifugal weights and friction pads thereon relative to the driven member or drum of the coupling, and radially of the transmission axis, in different operative phases of the device.

Referring to Figs. 1 and 2, the reference numeral 10 designates the drive shaft of a suitable power source or prime mover, such as an electric motor 11, to which the hub 12 of the torque-transmission device of this invention, generally designated 13, is fixedly connected. This is accomplished by splines or a longitudinal key and keyway 14. A set screw 15 restrains the hub from longitudinal movement on shaft 10.

The reference numeral 16 designates a driven shaft axially aligned with the driving shaft 10 and having similarly keyed thereon the driven member 17 which is also secured against axial movement by a set screw 18. The member 17 is provided with a flange 19 having a plurality of openings 20 parallel to shaft 16 adjacent the outer periphery of the member, which openings receive studs 21 screwed into the adjacent surface of a chambered drum 22, the latter constituting a a part of the torque-transmission device 13 and exerting angular driving engagement on the driven member 17. Studs 21 are preferably encased within the shock absorbing washers 23 to constitute a noiseless and self-adjusting rotative drive connection between member 17 and the device 13.

Drum 22 has an integral, radial end plate 24 in the embodiment illustrated which has a rotatable bearing on the perforated bearing sleeve 25 surrounding hub 12. The perforations in this sleeve, designated 25′, permit free radial flow of a lubricant to be described, also free flow of lubricant vapor for the purpose of lubricating the parts. The inner face 29 of end plate 24 tapers radially outwardly throughout a major portion of its annular surface; it coacts with a similarly tapered inner surface 30 on an annular ring 31 constituting the other end wall of the drum in defining a pair of annular, radially outwardly convergent surfaces which frictionally coact with centrifugal weight members to be described. Ring 31 is adjustably screwed into the adjacent side of the drum so that the distance between surfaces 29, 30 may be adjusted as desired and is held in adjusted position by a lock screw or screws 32. The friction faces 29, 30 may be formed comparatively roughly, i. e., without extensive machining, and still give excellent results.

The annular chamber in drum 13 between the frictional surfaces 29, 30 is adapted to be filled with a fluid lubricant or oil to a height about one-third the distance from the bottom of the chamber to the shaft center and suitable provisions are made in the end ring 31 for this purpose. Thus I have illustrated an upper air vent opening 33 normally plugged by a screw closure 34, while a further similarly plugged filling opening (not shown) may be provided in the ring at a lower relative position above the upper level of the oil in static condition of the device.

It will be observed that the hub 12 is provided with a plurality of radial guide openings 35 for the radially slidable reception of floating guide pins 36 which carry centrifugal weights 37. Hub 12 carries integral tubular guide extensions 38 projecting radially therefrom at guide openings 35 to extend the latter radially; a further purpose of these extensions will be hereinafter referred to.

The weights 37 have the transverse outline of a segment as illustrated in Fig. 3 and the opposite faces thereof axially of shaft 10 are tapered in the manner of the adjacent friction surfaces 29, 30 on the drum 22. Suitable recesses are provided in the tapered faces of the weights for the reception of friction pads 39, which are preferably fabricated of asbestos braking material or other similar or equivalent material having a relatively high coefficient of friction. I do not desire to be unduly limited in this respect, however, since I contemplate that any suitable provision for securing a frictional engagement of the weights 37 with the friction surfaces 29, 30 may be availed of. Thus weights 37 might be fabricated in the main of material having a high coefficient of friction, each presenting a continuous braking or frictional surface to the coacting surfaces 29, 30. In the illustrated embodiment, the pads 39 protrude from the faces of the weights and provide relatively small isolated friction areas for engagement with adjacent surfaces 29, 30.

It will be evident from the foregoing that when hub 12 is rotated upon rotation of the driving shaft 10, the weights 37 will tend to be thrown outwardly by centrifugal force for frictional engagement of the friction pads 39 with the respective surfaces 29, 30 on the drum. The body of oil in the drum assures that the lowermost pads will be at least partially immersed in and lubricated by the oil, and in the early rotations sufficient of the oil will be transported upwardly on the pads to initially lubricate all of the pads and surfaces 29, 30. The result is that during initial rotation there is a slight preliminary sliding action; however, this is immediately followed by a wiping action with rapidly increasing pressure to remove the film previously deposited on the surfaces 29, 30 as the pads 39 rotate and shift outwardly. The centrifugal force, in addition to shifting the weights outwardly, likewise causes the oil to be thrown outwardly into the outer radial extremity of the oil groove. Hence, the coefficient of friction of the pads increases from practically nil in the starting lubricated condition thereof up to its normal high coefficient of friction when dry. A graduated though rapid increase in frictional engagement up to full effectiveness takes place upon commencement of operation of the unit.

The provision of perforations 25′ in the bearing sleeve 25 assures free flow of lubricant and lubricant vapor internally of the driving and driven elements during the above described phases of operation, so that all parts of the device will be well oiled. This intercommunication also improves the functioning of the device during the de-coupled phase of operation to be described.

It is frequently desirable to de-couple a device such as I have described without halting or slowing down the operation of the prime mover. This may be indicated by various considerations; for example, the desirability of effecting certain quick repairs, inspections, or other adjustments of the driven unit. Also, if the driven unit or instrumentality should be under the control of a speed or output regulator, it may be desirable to render the torque transmission more or less effective, or to momentarily interrupt the same, to the end that said speed or output is maintained constant. I have therefore devised the clutch release arrangement herein shown for this purpose.

The weights 37, as has been pointed out, are carried by the floating guide pins 36 and for this purpose said pins are reduced in diameter at the outer ends thereof to provide a small shoulder 40 against which a stop washer 41 abuts. Said stop washer serves as an inner seat for the weights 37, the latter being provided with a radial aperture receiving the reduced end of the pin and being counterbored at 42 to provide a recess adapted to telescope over the tubular radial hub extensions 38. The outer extremities of the reduced ends of pins 36 are threaded and a spring washer and nut 43 disposed thereover to clamp the weight in assembled position against stop washer 41.

Referring to Figs. 1 and 2, it will be noted that hub 12 is recessed at 44 on the side thereof adjacent the prime mover 11 for the slidable reception of an annular cam member 45 which encircles but is radially separated from drive shaft 10. Member 45 is carried on a rotatable end thrust bearing 46 and is urged for disengaging movement, i. e., to the left as viewed in Figs. 1 and 2 by means of a shipper lever 47 coacting with said bearing, the lower ends of said lever straddling shaft 10. Cam member 45 is urged in the opposite direction by means of a coil spring 48 surrounding the member and engaging suitable abutments on the latter and in the recess 44. Outward movement of the cam member 45 in the direction of actuation by the spring 48 is limited by a stop ring 49 secured adjacent the outer opening of the recess by screws.

The cam member 45 is angularly subdivided into a plurality of spaced arcuate cam elements 50 (see Fig. 3), each provided with a long internal taper providing a cam surface 51. For coaction with these cam surfaces the guide pins 36 are provided at their inner ends with transverse journal pins 52 on which cam rollers 53 are rotatable at either side of the guide pins. Note in reference to Fig. 3 that cam member 45 is slotted to define the arcuate cam elements 50 and that each of the latter extends between and immediately adjacent a pair of guide pins 36, each cam element being of sufficient arcuate extent that it cammingly engages a roller 53 adjacent either side thereof as viewed in Fig. 3. In this manner the cam elements are self-aligned and exert simultaneous action on the rollers of all guide pins, to the end that they are shifted as a unit radially inwardly when desired by movement of lever 47 from the position of Fig. 1 to the position of Fig. 2. Upon such actuation rollers 53 ride over the inwardly moving cam surfaces 51 as shown in those figures to retract weights 37 radially inwardly.

Figs. 4, 5 and 6 further illustrate successive positions in the disengagement of the weights 37. In Fig. 4 the latter are shown in fully engaged position transmitting rotation from hub 12 to drum 22 in a 1:1 ratio, and it will be noted in this figure that the stop washer 40 against which the weight is clamped by nut 43 is elevated above the upper extremity of the tubular radial guide extension 38. In Fig. 5 the weight is being retracted downwardly and the friction pads 39 are out of engagement with the coacting surfaces 29, 30, the stop washer 40 being still elevated above the radial guide extensions. It will readily appear to those skilled in the art that if desired the lever can be engaged at a point in which the pads have not yet departed from engagement with surfaces 29, 30 but in which the centrifugal force exerted on the latter is less than full or maximum, and held in this position. This will set up a dry slip engagement which may be desirable in certain instances, although it should be borne in mind that this is not a lubricated connection and will evolve heat with no means to dissipate the same readily, since the oil is still maintained under centrifugal action outwardly of the pads.

It will be observed that when the driving and driven elements are de-coupled, i. e., in the position of Fig. 2, and with drum 22 restrained against rotation, the weights 37 will rotate through the body of oil in the lower portion of the drum and set up a decided turbulence therein, inasmuch as shaft 10 and hub 12 will be traveling at original speed. This results in lubricant being splashed thoroughly throughout the interior of drum 22 in its static condition, also in evolution of considerable oil vapor which will fill the entire inner cavity of the drum and hub. The apertures 25' in the bearing sleeve permit this thorough penetration, with the result that all operating parts are thoroughly lubricated. When the parts are re-engaged to the position of Fig. 1, a gradual though rapid removal of the oil from the surfaces of pads 39 and the coacting faces 29, 30 on the drum occurs, accompanied by centrifugal movement of the oil to the periphery of the drum, until the friction surfaces are again in 1:1 driving ratio. This assures that the device may be re-engaged without destructive shock even though shaft 10 be rotating at high speed, or driven member 17 be under considerable load, or both. I consider provisions of this type to be of great importance in a releasable torque-transmission device.

In Fig. 6 I illustrated the fully disengaged position of the weights, in which lever 47 is actuated clockwise, and it will be noted that the stop washer 40 has seating engagement with the radially outermost end of the guide extension 38, thereby limiting inward movement of the guide pins 36. It is not possible for cam rollers 53 to contact the rotating drive shaft. Referring to Fig. 2, it will also be observed that this stop position is reached while the cam rollers 53 are still operatively engaged with the rise of inclined cam surface 51. Hence, the weights are at all times capable of immediate outward centrifugal movement without time lag due to lost motion when the lever 47 is manipulated counterclockwise for re-engagement of the drive. The weights will not become locked in inoperative position, but when the lever is swung counterclockwise, spring 48 immediately thrusts the cam out to the inoperative position of Fig. 1 and re-engagement of the clutch results, accompanied by desired rapid but graduated increase in effectiveness from zero lubricated condition to full 100% efficiency. Lever 47 is suitably pivoted on a fixed mount 54 which may be carried by the prime mover 11 or other support. This lever has thumb controlled latching provisions of a known type, coacting with an arcuate, detent-engaging member 55 which is likewise suitably mounted on a fixed support, to the end that lever 47 may be disposed and held in the retracted de-clutching and inoperative position illustrated in Fig. 1, in an opposite actuated and clutch-engaging position as illustrated in Fig. 2, or an intermediate, partial pressure clutching position therebetween. In order to make this possible I provide the intervening notches 56 on the arcuate member 55 between the limiting recesses 57 in which latter the thumb controlled detent 58 is engageable, and I provide coacting notches on the outer end of the thumb controlled detent element 58. Thus the latter may be latched in one or the other of the recesses 57 to fully engage or disengage the transmission or it may be set intermediately for a dry slip clutch drive.

I am aware that it has been proposed to provide centrifugal weight lubricated torque transmissions of the type described in which weights are thrust outwardly by centrifugal action with reference to a central drive member on which they are mounted and guided by radial projections on the latter. However, I consider it to be novel with me to provide a torque-transmitting device of this general type wherein the guides themselves are restrainedly floating, in combination with simultaneously acting means for camming or otherwise disengaging all of the weights as a unit by coaction with the floating guides thereof. This concept provides a highly desirable flexibility of control superimposed on the manifold advantages of an initially lubricated centrifugal coupling. This combination is extremely versatile in its applicability to loads and outputs ranging from fractional horse power to any desired range consistent with the limitations of a centrifugal friction device. The insurance against shock upon re-coupling the driven member to the rotating driving member, regardless of the speed of the latter, is of great importance under almost any conceivable conditions of load, speed or other output requirement.

What I claim is:

1. In combination, in a torque transmission of the type described, coaxial rotatable driving and driven members, the driving member carrying a plurality of radially shiftable weights and the driven member having means centrifugally and frictionally engageable by said weights when the driving element is rotated to couple the members for rotation as a unit, means for floatingly mounting said weights for said radial shifting movement comprising radial guide elements to which said weights are connected, carried by the driving member for angular movement therewith and radially shiftable relative thereto, control means shiftable axially of said members and controlled exteriorly thereof having operative engagement with said guide elements to retract said weights radially inwardly in opposition to the centrifugal force thereof, without interrupting rotation of said driving member, and thereby de-couple the members, and means movable with said weights and guide elements and engageable with said driving member upon retraction of the weights for limiting the inward movement of the weights by said control means.

2. In combination, in a torque transmission of the type described, coaxial, rotatable inner driving and outer driven members, the driving member carrying a plurality of radially shiftable weights having frictional means outwardly engageable with the driven member under centrifugal force to couple the driving and driven members for rotation as a unit, said outer driven member defining a substantially closed annular chamber and having a lubricating fluid therein adapted to lubricate said frictional means when the members are at rest or in the initial phase of rotation thereof together, means for floatingly mounting said weights for radial shifting movement comprising radial guide elements to which said weights are connected, carried by the driving member for angular movement therewith and radially shiftable relative thereto, and control means having operative engagement with said guide elements to retract said weights and frictional means inwardly in opposition to the centrifugal force thereof and thereby de-couple the driving and driven members without interrupting rotation of the former, said lubricating fluid lubricating said friction means during the de-coupled phase.

3. In combination, in a torque transmission of the type described, coaxial, rotatable inner driving and outer driven members, the driving member carrying a plurality of radially shiftable weights having frictional means outwardly engageable with the driven member under centrifugal force to couple the driving and driven members for rotation as a unit, said outer driven member defining a substantially closed annular chamber and having a lubricating fluid therein adapted to lubricate said frictional means when the members are at rest or in the initial phase of rotation thereof together, means for floatingly mounting said weights for radial shifting movement comprising radial guide elements to which said weights are connected, carried by the driving member for angular movement therewith and radially shiftable relative thereto, control means having operative engagement with said guide elements to retract said weights and frictional means inwardly in opposition to the centrifugal force thereof and thereby de-couple the driving and driven members without interrupting rotation of the former, said lubricating fluid lubricating said friction means during the de-coupled phase, and means for limiting the inward movement of the weights.

4. A torque transmission of the type described, comprising an inner driving member provided with a plurality of weighted centrifugal friction elements angularly driven thereby, said friction elements being provided with retracting portions operatively connected thereto and being guided in said driving member for radial centrifugal movement, an outer drum-like driven member coaxial with the driving member having an interior surface engageable by said friction elements to frictionally couple the members for rotation together, said driven member having a quantity of fluid lubricant therein adapted upon initial rotation to lubricate said elements and surface and thereafter be removed from the surface by wiping action of said friction elements, and means controlled externally of said transmission for disengaging said friction elements from said surface, comprising means cammingly engageable with said retracting portion to shift the elements radially inwardly in opposition to the centrifugal force thereof and thereby de-couple the driven member therefrom, said lubricant lubricating the transmission internally of the drum-like driven member during said de-coupled phase.

5. A torque-transmission device of the type described, comprising coaxial rotatable inner driving and outer driven members, a plurality of weights angularly driven by said driving member and radially shiftable relative thereto under centrifugal force for frictional engagement with said driven member to thereby couple the members for rotation together, means operatively mounting said weights relative to the driving member, comprising radially floating guide pins to which said weights are operatively secured, radially guided in and angularly driven by said driving member in the rotation thereof, means for interrupting or minimizing at will and in opposition to said centrifugal force the frictional engagement of said weights and driven member, comprising cam-engaging means connected to said pins to shift said pins radially inwardly in opposition to said force, a cam rotatable with said driving member and shiftable axially thereof for camming engagement with said last named means, and stop means operatively secured to said pins and coacting with said driving member to limit the radial inward movement of said weights.

6. A torque transmission of the type described, comprising an inner driving member provided with a plurality of weighted centrifugal elements angularly driven thereby, said weights being guided for radial shifting movement relative to the driving member, an outer drum-like driven member having an internal surface engageable by said friction elements under centrifugal force of rotation thereof to frictionally couple the members for rotation together, said driven member having a quantity of fluid lubricant therein in which said elements are at least partially immersed in static condition, adapted upon initial rotation to lubricate said surface and thereafter to be removed from the surface under centrifugal force and wiping engagement therewith by said friction elements, and means to retract said elements while rotating from engagement with said friction surface to de-couple the driving and driven members, said lubricant being agitated by said rotating elements during said de-coupled phase to thoroughly lubricate the interior of the transmission.

ARTHUR H. JENSON.

REFERENCES CITED

The following references are of record in the file of this patent:

UNITED STATES PATENTS

| Number | Name | Date |
|---|---|---|
| 1,910,352 | Moyer | May 23, 1933 |
| 1,392,352 | Prestwich | Oct. 4, 1921 |
| 34,012 | Reynolds | Dec. 24, 1861 |

FOREIGN PATENTS

| Number | Country | Date |
|---|---|---|
| 813,293 | France | May 29, 1937 |